Patented Nov. 10, 1931

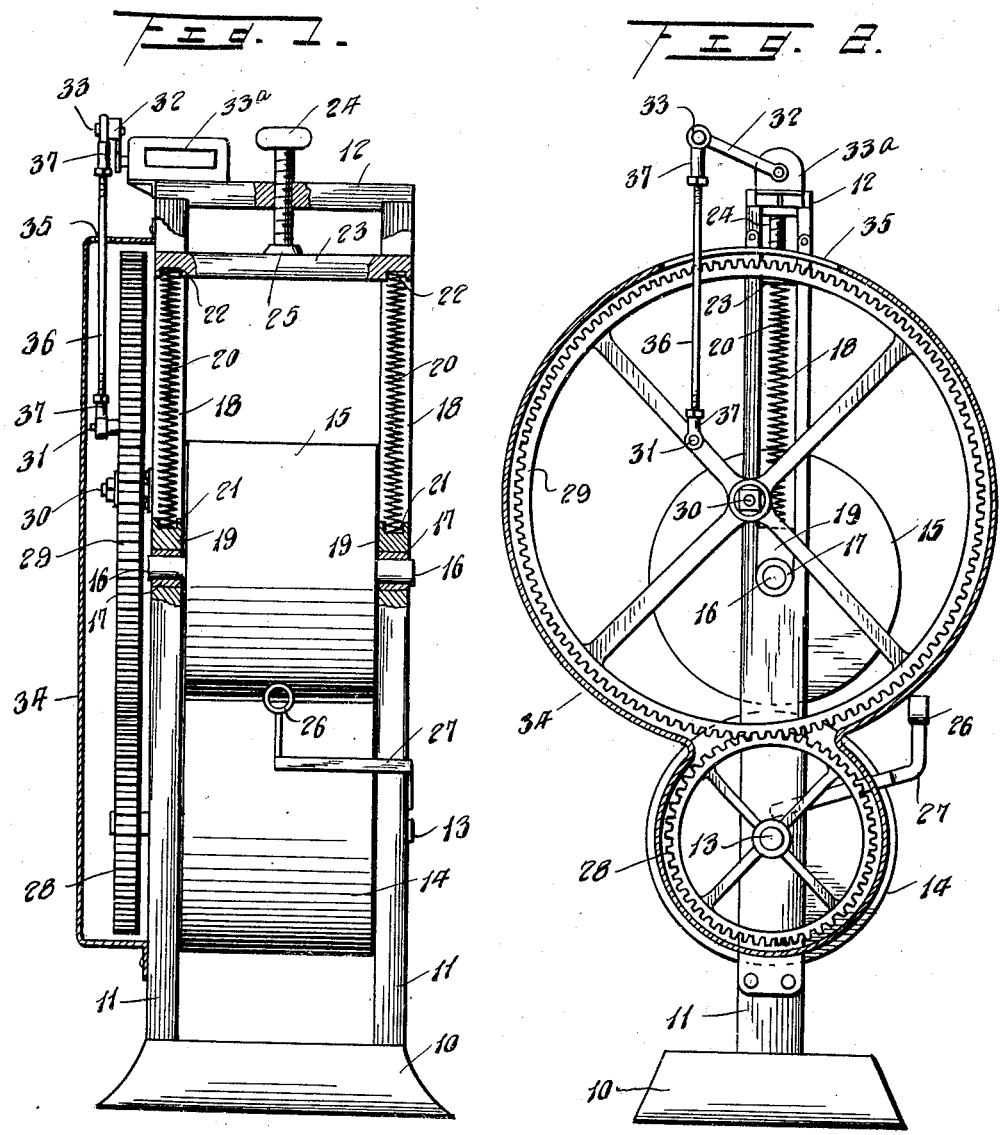

1,831,750

UNITED STATES PATENT OFFICE

VALENTINE J. PHILLIPS, OF JOHNSTOWN, PENNSYLVANIA

WIRE MEASURING DEVICE

Application filed March 28, 1929. Serial No. 350,603.

This invention relates to a device or machine for measuring wire, rope or the like and is especially adapted for use as an accessory in a warehouse, storeroom or the like.

It is particularly aimed to provide a novel machine which will accurately measure electric wire or conductor strands.

An additional object is to provide a novel construction which is exceedingly simple, compact and inexpensive, and in which the measuring is accomplished accurately through gearing, the latter having an adjustable connection with a revolution counter.

The more specific objects and advantages will become apparent from a consideration of the description following taken in connection with accompanying drawings illustrating an operative embodiment.

In said drawings:—

Figure 1 is a view principally in side elevation, being partly in section to disclose details, and Figure 2 is a front elevation, partly in section to disclose details.

Referring specifically to the drawings, the apparatus may be made of any size or material desired and consists of a base 10 from which spaced uprights 11 rise, which latter are joined by a cross member 12 at the top. Journaled in the uprights 11 is a transverse shaft 13 on which a winding drum 14 is keyed and which winding drum coacts with a winding drum 15 located above the same and being keyed on a shaft 16 journaled in bearings 17 which are vertically movable in elongated slots 18 provided in the uprights 11. The bearings 17 are carried by blocks 19 located and slidable in said slots 18. Expansive coil springs 20 are located in the slots 18 and are positioned with their lower ends extending into sockets 21 in the blocks 19 and in sockets 22 in a cross head 23 also vertically slidable in said slots 18. Such cross head 23 is vertically movable or adjustable through the medium of a manually operable screw 24 threaded through the bar 12 and swivelled as at 25 on the cross head 23, the adjustment of the bar 23 serving to tension the springs 20.

The rope, cable, wire, electric conductors or other material to be dispensed and measured is passed between the drums 14 and 15 and the material as it is paid out passes through a guide eyelet 26 formed on a bracket 27 fastened to one of the uprights 11. As the rope or the like is paid out, it rotates the drum 14 being held in frictional engagement therewith by drum 15 urged by the springs 20, drum 14 rotating shaft 13. Keyed on the shaft 13 is a gear wheel 28 which meshes with a gear wheel 29, the circumference of that at 28 being for instance six inches and that at 29 being for instance 12 inches so that there is a gear ratio of two to one between such gears. Gear 29 is journaled on a stub shaft 30 suitably fastened on one of the uprights 11 and a pitman 36 extends from gear wheel 29, being pivoted thereto as at 31 and pivoted to an arm 32 as at 33. The arm 32 operates a revolution counter 33ª suitably mounted on the beam or cross member 12.

A protecting casing 34 is disposed about the various gears 28 and 29 as shown and the casing 35 has an elongated or enlarged slot through which the pitman 36 passes and is accommodated in its movement.

As a result of the construction described, each rotation of the drum 14 pays out the same amount of material and its gear 28 is preferably arranged at the ratio of two to one to the gear 29 and the latter so proportioned that each revolution of the gear wheel 29 pays out one foot of material, although any unit may obviously be used instead of one foot. Each revolution of the gear wheel 29 through the action of the pitman 36 causes the crank or lever 32 to make a turn and thus operate the revolution counter 33ª, each turn thus indicating a foot of the material that has been paid out or unreeled.

The pitman 36 is adjustable so that operation will be accurate and the same way comprise a rod 36 screw threaded in end members 37 as shown.

Various changes may be resorted to provided they fall within the spirit and scope of the invention.

I claim as my invention:—

A machine of the class described having uprights, a cross member thereon at the top thereof, a revolution counter on said cross member, said uprights having slots, a cross bar disposed in said slots, a screw mounted in the cross member operable to vary the position of the cross bar, a power roller having a shaft with bearings vertically movable in said slots, springs engaged by the cross bar and engaging said bearings expansively, a paying out roller associated with the first mentioned roller having a shaft, a gear wheel on the latter shaft, a gear wheel in mesh with said gear wheel, said gear wheels being outwardly of the uprights, a stub shaft on one of the uprights mounting the second mentioned gear wheel, a pitman extending from the second mentioned gear wheel to the revolution counter, and a casing fastened to one of the uprights and about the gearing, said casing having an enlarged slot therethrough accommodating the operation of said pitman.

In testimony whereof I affix my signature.

VALENTINE J. PHILLIPS.